(12) United States Patent
Ma et al.

(10) Patent No.: US 10,190,748 B2
(45) Date of Patent: Jan. 29, 2019

(54) BACKLIGHT MODULE

(71) Applicant: AU Optronics Corporation, Hsin-Chu (TW)

(72) Inventors: Chi-Tang Ma, Hsin-Chu (TW); Wei-Chun Chung, Hsin-Chu (TW); Su-Yi Lin, Hsin-Chu (TW); Chun-Liang Lin, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 164 days.

(21) Appl. No.: 15/374,037

(22) Filed: Dec. 9, 2016

(65) Prior Publication Data
US 2017/0167691 A1    Jun. 15, 2017

(30) Foreign Application Priority Data
Dec. 11, 2015    (TW) .............................. 104141632 A

(51) Int. Cl.
F21V 7/00    (2006.01)
F21V 7/04    (2006.01)
(Continued)

(52) U.S. Cl.
CPC .............. *F21V 7/04* (2013.01); *F21V 7/0016* (2013.01); *G02B 19/0019* (2013.01); *G02B 19/0066* (2013.01); *G02F 1/1335* (2013.01)

(58) Field of Classification Search
CPC .. G02B 17/002; G02B 17/004; G02B 17/006; G02B 19/0019; G02B 19/0066; G02F 2001/133567; G02F 2001/13356; G02F 2001/133562; G02F 1/1335; G02F 1/195; G02F 1/133611; G02F 1/133605; G02F 1/133603; F21V 7/0008; F21V 7/04;
(Continued)

(56) References Cited

U.S. PATENT DOCUMENTS 5,684,486 A    11/1997    Ono et al.
7,033,061 B1 *  4/2006    Wu ........................... F21V 5/00
                                                          359/599
(Continued)

FOREIGN PATENT DOCUMENTS

CN    101629697 A    1/2010
CN    103047587 A    4/2013
(Continued)

Primary Examiner — Erin Kryukova
(74) Attorney, Agent, or Firm — WPAT, PC

(57) ABSTRACT

A backlight module includes a reflecting base, a light source, at least one 3D optical control structure, and at least one illumination adjusting structure. The light source and the 3D optical control structure are disposed on the reflecting base, and the 3D optical control structure covers the light source. Each 3D optical control structure includes two sidewalls, and at least one of the sidewalls has at least one through-hole. The illumination adjusting structure is adjacent to the sidewall having the through-hole. A position of an orthogonal projection of the through-hole to the reflecting base is A, and a position where a normal line of the sidewall passing through the through-hole intersects the reflecting base is B. An illumination adjusting section is an area between A and B. The illumination adjusting structure is disposed in the illumination adjusting section.

16 Claims, 4 Drawing Sheets

(51) Int. Cl.
*G02F 1/1335* (2006.01)
*G02B 19/00* (2006.01)

(58) Field of Classification Search
CPC .... F21V 7/0016; F21V 7/0033; F21V 7/0041;
F21V 7/0083; F21V 7/0058; F21V 7/041;
F21V 7/05; F21V 7/09; F21V 7/22; F21V
7/24; F21V 7/26; F21V 7/28; F21V 7/30
See application file for complete search history.

(56) References Cited

U.S. PATENT DOCUMENTS

| | | | |
|---|---|---|---|
| 8,646,930 | B2 | 2/2014 | Shen et al. |
| 9,348,085 | B2 | 5/2016 | Chien et al. |
| 2005/0099806 | A1 | 5/2005 | Tsai |
| 2005/0138852 | A1* | 6/2005 | Yamauchi ................ F21V 7/10 40/582 |
| 2007/0159573 | A1* | 7/2007 | Lee .................... G02F 1/133606 349/65 |
| 2010/0135003 | A1 | 6/2010 | Huang et al. |
| 2012/0069248 | A1* | 3/2012 | Yokota .............. G02F 1/133605 348/739 |
| 2012/0155071 | A1* | 6/2012 | Sato ......................... F21V 7/22 362/217.05 |
| 2013/0286656 | A1* | 10/2013 | Park ........................ F21V 13/02 362/307 |
| 2016/0077381 | A1 | 3/2016 | Ma et al. |
| 2016/0356429 | A1* | 12/2016 | Wang ........................ F21K 9/68 |

FOREIGN PATENT DOCUMENTS

| | | |
|---|---|---|
| CN | 203375233 U | 1/2014 |
| CN | 103982815 A | 8/2014 |
| CN | 105652518 | 6/2016 |
| TW | 201413349 | 4/2014 |
| TW | I443425 | 7/2014 |

\* cited by examiner

BACKLIGHT MODULE

TECHNICAL FIELD

The present disclosure relates to a backlight module, and more particularly to a backlight module capable of providing better optical behavior.

BACKGROUND ART

Recently, with the widespread use of electronic products, display panels used in the electronic products for providing the display function have become the focus of attention by designers. There are a variety of display panels and they can be selected according to the design of electronic products. Some types of display panels do not have a light emitting function in themselves, and a backlight module is required to be disposed thereunder to provide a light source for achieving the display function.

The backlight module generally comprises an assembling frame, a light source, and a flat optical control plate. Depending on the relative positions of the light source and the flat optical control plate, the backlight module can be divided into direct type and edge type backlight modules. Taking the direct type backlight module as an example, the light source and the flat optical control plate are disposed within the assembling frame, and the light source is located below the flat optical control plate, such that light from the light source is emitted out of the backlight module after the transfer direction or distribution mode of the light is directed and adjusted by the flat optical control plate. However, although the flat optical control plate has been available for adjusting the transfer direction or distribution mode of the light in the backlight module, the mura phenomenon of some non-uniform brightness/darkness distribution still occur. Thus, how to enable the backlight module to emit light of uniform brightness is always an issue to be addressed in the art.

SUMMARY OF THE INVENTION

The present disclosure provides a backlight module which is capable of providing light of more uniform brightness.

A backlight module of the present disclosure comprises: a reflecting base; a light source, disposed on the reflecting base; at least one 3D optical control structure, disposed on the reflecting base and covering the light source, the 3D optical control structure comprising a top portion and two sidewalls connected to the top portion, wherein the two sidewalls face the reflecting base obliquely and opposite to each other, and at least one of the sidewalls comprises at least one through-hole; and at least one illumination adjusting structure, adjacent to the sidewall having the through-hole. A position of an orthogonal projection of the through-hole to the reflecting base is A, and a position where a normal line of the sidewall passing through the through-hole intersects the reflecting base is B. An illumination adjusting section is an area between A and B, and the at least one illumination adjusting structure is disposed in the illumination adjusting section.

In one embodiment of the present disclosure, the sidewall having the through-hole further comprises a plurality of through-holes. A position of an orthogonal projection of one of the through-holes closest to the reflecting base is A', and a position where a normal line of the sidewall passing through one of the through-holes furthest from the reflecting base intersects the reflecting base is B'. The illumination adjusting section is an area between A' and B'.

In one embodiment of the present disclosure, the illumination adjusting structure comprises a plurality of holes, a light-absorbing ink layer, a light-absorbing adhesive layer, a rough surface, or a combination thereof.

In one embodiment of the present disclosure, the illumination adjusting structure is disposed at the reflecting base, and the illumination adjusting structure comprises a plurality of holes in the illumination adjusting section at the reflecting base.

In one embodiment of the present disclosure, the holes of the illumination adjusting section have various sizes, and various spacings exist between the holes.

In one embodiment of the present disclosure, the illumination adjusting structure is disposed at the reflecting base. The illumination adjusting structure comprises a light-absorbing ink layer, a light-absorbing adhesive layer, or a rough surface.

In one embodiment of the present disclosure, the 3D optical control structure further comprises a bottom portion connected to the at least one sidewall, the bottom portion is disposed on the reflecting base, and the illumination adjusting structure is disposed on the bottom portion.

In one embodiment of the present disclosure, the illumination adjusting structure disposed on the bottom portion is a plurality of through-holes, and the through-holes have light-absorbing layers therein.

In one embodiment of the present disclosure, the 3D optical control structure further comprises a bottom portion connected to the at least one sidewall, and the bottom portion is disposed on the reflecting base. The illumination adjusting section is partially located at the bottom portion and partially located at the reflecting base.

In one embodiment of the present disclosure, the illumination adjusting structure is a plurality of through-holes, a light-absorbing ink layer, or a light-absorbing adhesive layer.

In one embodiment of the present disclosure, the top portion and the sidewalls of the 3D optical control structure are a planar surface, a cambered surface, or a curved surface.

In one embodiment of the present disclosure, the backlight module further comprises an optical film, located above the reflecting base, the light source, and the 3D optical control structure.

A 3D optical control assembly of the present disclosure comprises: a top portion; two sidewalls, connected to the top portion respectively, wherein the two sidewalls extend downwards from the top portion obliquely and opposite to each other, and at least one of the sidewalls comprises at least one through-hole; at least one bottom portion, connected to the sidewall having the through-hole; and at least one illumination adjusting structure, located at the bottom portion. A position of an orthogonal projection of the through-hole to the bottom portion is A, and an illumination adjusting section is an area between A and an edge of the bottom portion, and the at least one illumination adjusting structure is disposed in the illumination adjusting section.

The sidewall having the through-hole further comprises a plurality of through-holes. A position of an orthogonal projection of one of the through-holes closest to the bottom portion to the bottom portion is A', and the illumination adjusting section is an area between A' and the edge of the bottom portion.

In one embodiment of the present disclosure, the illumination adjusting structure comprises a plurality of holes, a light-absorbing ink layer, a light-absorbing adhesive layer, a rough surface, or a combination thereof.

In one embodiment of the present disclosure, the illumination adjusting structure is a plurality of holes, the holes have various sizes, and various spacings exist between the holes.

In one embodiment of the present disclosure, the illumination adjusting structure is a plurality of through-holes, and the through-holes have light-absorbing layers therein.

In one embodiment of the present disclosure, the top portion is parallel to the bottom portion, and a sharp angle is formed between the sidewalls and the bottom portion.

To make the above characteristics and advantages of the present disclosure clearer and easier to understand, the following embodiments are described in detail in conjunction with accompanying figures.

BRIEF DESCRIPTIONS OF THE DRAWINGS

DETAILED DESCRIPTIONS OF THE INVENTION

Figure 1A:
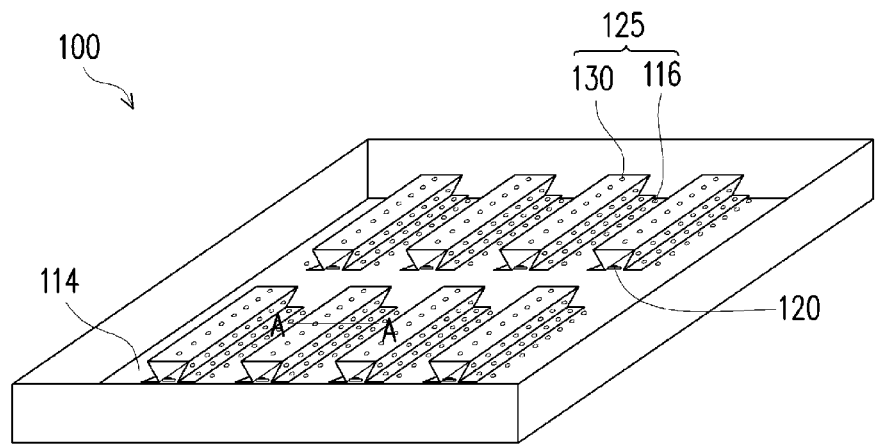
FIG. 1A is a schematic perspective view of a backlight module according to one embodiment of the present disclosure.
Figure 1B:
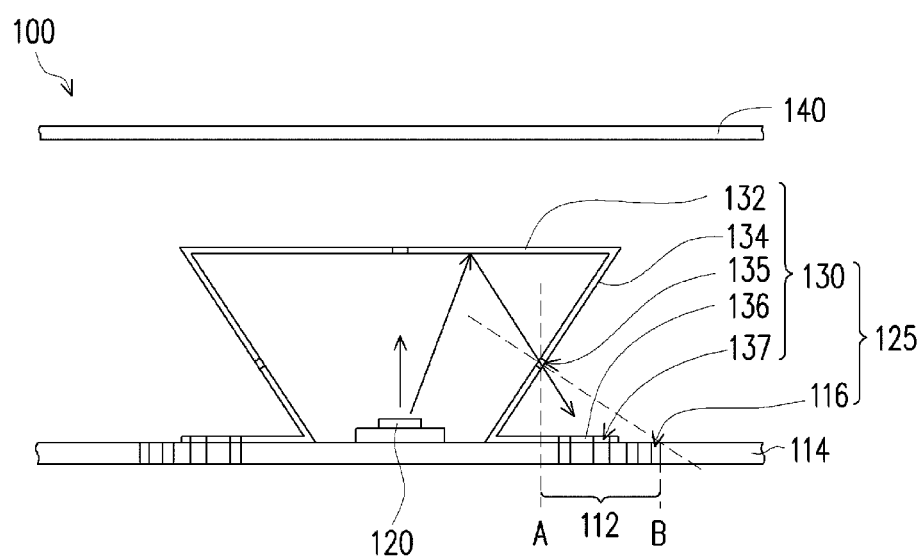
FIG. 1B is a partially cross-sectional schematic view along a line A-A in the backlight module of FIG. 1A.

FIG. 1A is a schematic perspective view of a backlight module according to one embodiment of the present disclosure. FIG. 1B is a partially cross-sectional schematic view along a line A-A in the backlight module of FIG. 1A. Referring to FIG. 1A and FIG. 1B, the backlight module 100 in the present embodiment comprises a reflecting base 114, a plurality of light sources 120, a plurality of 3D optical control assemblies 125, and an optical film 140 (the optical film 140 is hided in FIG. 1A for clear illustration of other components, and marked in FIG. 1B). In FIG. 1A, these 3D optical control assemblies 125 are disposed on the reflecting base 114 parallel to each other, and each of the 3D optical control assemblies 125 comprises a 3D optical control structure 130 and a plurality of illumination adjusting structures 116. The 3D optical control structures 130 are elongated, and two rows of the illumination adjusting structures 116 are located at both sides of each 3D optical control structure 130, respectively. Of course, the number of the 3D optical control assemblies 125, the arrangement mode of the 3D optical control assemblies 125 on the reflecting base 114, and the configuration relationship between the 3D optical control structures 130 and the illumination adjusting structures 116 are not limited thereto.

In FIG. 1B, one of the light sources 120 and one of the 3D optical control assemblies 125 in FIG. 1A are taken to illustrate the relative location relationship between the components. As shown in FIG. 1B, the reflecting base 114 has an illumination adjusting section 112, and more specifically, the illumination adjusting structure 116 comprises a plurality of holes in the illumination adjusting section 112 at the reflecting base 114. Of course, the type of the illumination adjusting structure 116 is not limited thereto, and in other embodiments, the illumination adjusting structure 116 may also be a light-absorbing ink layer, a light-absorbing adhesive layer, a rough surface, or a combination thereof. The definition of the illumination adjusting section 112 will be mentioned in other paragraphs below.

The light source 120 is disposed on the reflecting base 114 and located at a region other than the illumination adjusting section 112. In the present embodiment, the light source 120 may be an LED or another suitable light source. The 3D optical control structure 130 is disposed on the reflecting base 114 and located at the region other than the illumination adjusting section 112, and the 3D optical control structure 130 covers the light source 120.

In the present embodiment, from FIG. 1B, the 3D optical control structure 130 comprises a top portion 132 and two sidewalls 134 connected to the top portion 132, respectively, for forming an optical control space. Alternatively, the 3D optical control structure 130 may further include two bottom portions 136 connected to the two sidewalls 134. The top portion 132, the sidewalls 134, and the bottom portions 136 of the 3D optical control structure 130 are a planar surface, respectively, both the top portion 132 and the bottom portions of the 3D optical control structure 130 are parallel to the reflecting base 114, and the bottom portions 136 are disposed on the reflecting base 114. The two sidewalls 134 of the 3D optical control structure 130 face the reflecting base 114 obliquely and opposite to each other, the two sidewalls 134 are symmetrical, and the two sidewalls 134 and the reflecting base 114 or the bottom portions 136 define a sharp angle, respectively.

Of course, the shape of the 3D optical control structure 130 is not limited thereto, and in other embodiments, the top portion 132 of the 3D optical control structure 130 may also not be parallel to the reflecting base 114, and the two sidewalls 134 of the 3D optical control structure 130 may also be asymmetrical to define different angles with the bottom portions 136 or the reflecting base 114. In addition, the top portion 132 and the sidewalls 134 of each 3D optical control structure 130 may also be in the form of a cambered surface, a curved surface, or an irregular surface, respectively. The bottom portions 136 attached to the reflecting base 114 may also be omitted in the 3D optical control structure 130. If desired, designers can adjust the form of the 3D optical control structure 130 (not shown).

In addition, the sidewall 134 comprises at least one through-hole 135. It is to be noted that, in FIG. 1B, only one through-hole 135 is schematically shown on the sidewall for brevity, to illustrate the definition of the illumination adjusting section 112. In practice, the sidewall 134 may have a plurality of through-holes 135. In addition, the 3D optical control structure 130 not only has the through-hole 135 on the sidewall, but also has a plurality of through-holes on the top portion 132, for some light emitted from the light source 120 to be directly transmitted through the top portion 132.

More specifically, in the present embodiment, the 3D optical control structure 130 is a 3D porous reflecting structure of high reflectivity, with the function of high reflectivity in an inner surface thereof, which can adjust the transfer direction and distribution mode of the light emitted from the light source. For example, the top portion 132 of the 3D optical control structure 130 may have a plurality of through-holes of different numbers or areas (not shown), such that different regions of the top portion 132 have different light-transmission amounts. Similarly, the sidewall 134 may also have a plurality of through-holes 135 of different numbers or areas, such that different regions of the sidewall 134 have different light-transmission amounts.

For example, at a region corresponding to the light source 120, the top portion 132 of the 3D optical control structure 130 has the through-holes of a small number or area, to allow a low light-transmission amount. In contrast, at other regions not corresponding to the light source 120, the top portion 132 of the 3D optical control structure 130 has the through-holes of a large number or area, to provide a high light-transmission amount. Similarly, the sidewall 134 of the 3D optical control structure 130 has the through-holes 135 of a small number or area at a site closer to direct light emitted from the light source 120, and has the through-holes 135 of a large number or area at a site further from the direct light emitted from the light source 120 (only one through-hole 135 is shown in the figure for brevity to facilitate the definition of the illumination adjusting section 112 below, but in practice, the number, position, and size of the through-holes 135 are not limited to those in the figure). Hence, the light emitted from the light source 120 can be transferred to the outside only after it passes through the 3D optical control structure 130 for adjusting its distribution profile, to improve the uniformity of the light.

In the present embodiment, since the 3D optical control structure 130 itself can freely stand on the reflecting base 114 by its own structure, no additional spacer is required to provide the support for the 3D optical control structure 130. Compared to the conventional flat optical control plate disposed above a light source, which requires a plurality of spacers or supporters to maintain the distance with the light source, the spacers may be omitted for the backlight module 100 in the present embodiment, which can save the cost of the materials and molds. In addition, compared to the flat optical control plate, the 3D optical control structure 130 in the present embodiment also provides the through-holes 135 of the sidewall 134 for adjusting the light distribution at both sides close to the light source 120.

In addition, the optical film 140 is located above the reflecting base 114, the light source 120, and the 3D optical control structure 130. The optical film 140 is, for example, a prism film, a diffusion film, a brightness enhancement film (BEF), a polarizer film, or the like, to adjust the transfer direction or distribution mode of the light emitted from the light source 120. In other embodiments, the design of the optical film 140 may also be omitted.

It is to be noted that, since some light emitted from the light source 120 will directly pass through the through-holes of the top portion 132 and the through-holes 135 of the sidewall 134, some light will be reflected by the top portion 132 to pass through the through-holes 135 of the sidewall 134 to be directed toward the reflecting base 114. Since such light which is reflected by the top portion 132 to directly pass through the through-holes 135 of the sidewall 134 is once-reflected with a strong light energy, directing such light at the reflecting base 114 and then reflection by the reflecting base 114 will lead to bright regions of the backlight module 100, resulting in non-uniform brightness/darkness of the light emitted from the backlight module 100. In the present embodiment, in order to overcome the problem of non-uniform brightness/darkness for this reason, a particular design is provided for a region irradiated by such light that is reflected by the top portion 132 to directly pass through the through-holes 135 of the sidewall 134 to be directed toward the reflecting base 114 (i.e. the illumination adjusting section 112), to reduce the brightness of the light reflected by this region, avoiding non-uniform brightness of the backlight module 100 due to excessive brightness of the light reflected by this region.

Figure 1C:
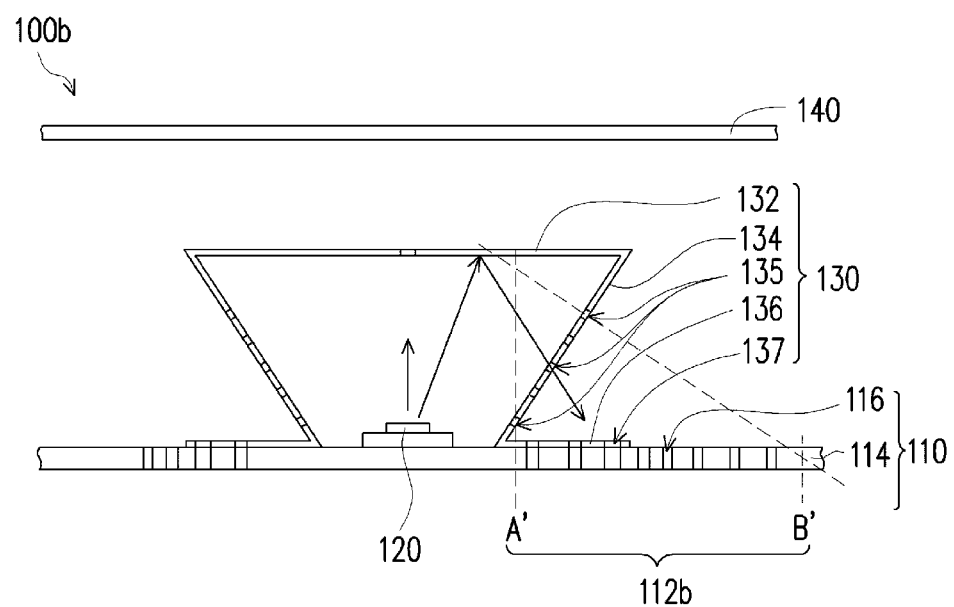
FIG. 1C is a partially cross-sectional schematic view of a backlight module according to another embodiment of the present disclosure.

Here, the range of the illumination adjusting section 112 is firstly defined. In FIG. 1B, taking only one through-hole 135 on the sidewall 134 as an example, if a position of an orthogonal projection of the through-hole 135 to the reflecting base 114 is A, and a position where a normal line of the sidewall 134 passing through the through-hole 135 intersects the reflecting base 114 is B, the illumination adjusting section 112 is an area between A and B. FIG. 1C is a partially cross-sectional schematic view of a backlight module according to another embodiment of the present disclosure. In a backlight module 100b of FIG. 1C, components which are the same as or similar to those in the previous embodiment are indicated by the same or similar symbols. Referring to FIG. 1C, the sidewall 134 comprises a plurality of through-holes 135. A position of an orthogonal projection of one of the through-holes 135 closest to the reflecting base 114 to the reflecting base 114 is A', and a position where a normal line of the sidewall 134 passing through one of the through-holes 135 furthest from the reflecting base 114 intersects the reflecting base 114 is B', forming a corresponding illumination adjusting section 112b (i.e. an area between A' and B').

Figure 2:
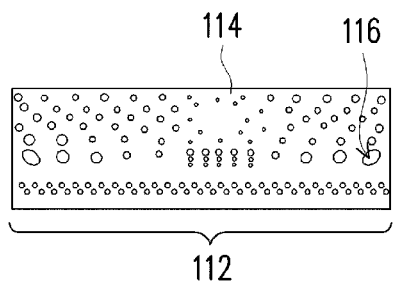
FIG. 2 is a schematic top view of a reflecting base of the backlight module of FIG. 1B in an illumination adjusting section.

FIG. 2 is a schematic top view of the reflecting base of the backlight module of FIG. 1B in the illumination adjusting section. Referring to FIG. 2, in the present embodiment, since the light reflected by the top portion 132 to directly pass through the through-holes 135 of the sidewall 134 will fall within the illumination adjusting section 112, the reflecting base 114 is provided with these illumination adjusting structures 116 (holes) in the illumination adjusting section 112, such that some light falling within the illumination adjusting section 112 can pass through the illumination adjusting structures 116 and only some light can be reflected by the reflecting base 114. Hence, the brightness of the light reflected by the illumination adjusting section 112 is reduced, avoiding the generation of bright regions. As shown in FIG. 2, in the present embodiment, the size and spacing of these illumination adjusting structures 116 of the reflecting base 114 in the illumination adjusting section 112 may be adjusted according to the requirements and are not limited to those in the figure. That is, the illumination adjusting structures 116 may have the same size and equal spacing (not shown).

Turning back to FIG. 1B, a part of the bottom portion 136 of the 3D optical control structure 130 is located at the illumination adjusting section 112. An upper surface of the bottom portion 136 has a reflection function, and the part located at the illumination adjusting section 112 also has a plurality of pores 137, corresponding in position to the illumination adjusting structures 116. Some light passing through the sidewall 134 is transmitted through the pores 137 of the bottom portion 136 and the illumination adjusting structures 116 of the reflecting base 114, without being reflected by the reflecting base 114. Of course, in other embodiments, the bottom portion 136 of the 3D optical control structure 130 may also be not located at the illumination adjusting section 112, without providing the pores 137 on the bottom portion 136.

In the backlight module 100 in the present embodiment, by absorbing or dispersing some light directed at the illumination adjusting section 112, the amount of the light reflected by the illumination adjusting section 112 is reduced, avoiding the formation of bright regions. In other words, in the reflecting base 114, the reflectivity of the illumination adjusting section 112 will be less than the reflectivity of other sites, such that less light is reflected by the illumination adjusting section 112.

It is to be noted that, only one form of the illumination adjusting section 112 is provided above, and in other embodiments, the brightness reflected by the reflecting base 114 of the light that is reflected by the top portion 132 to directly pass through the through-holes 135 of the sidewall 134 can be adjusted through the design of light scattering or absorption.

Figure 3A:
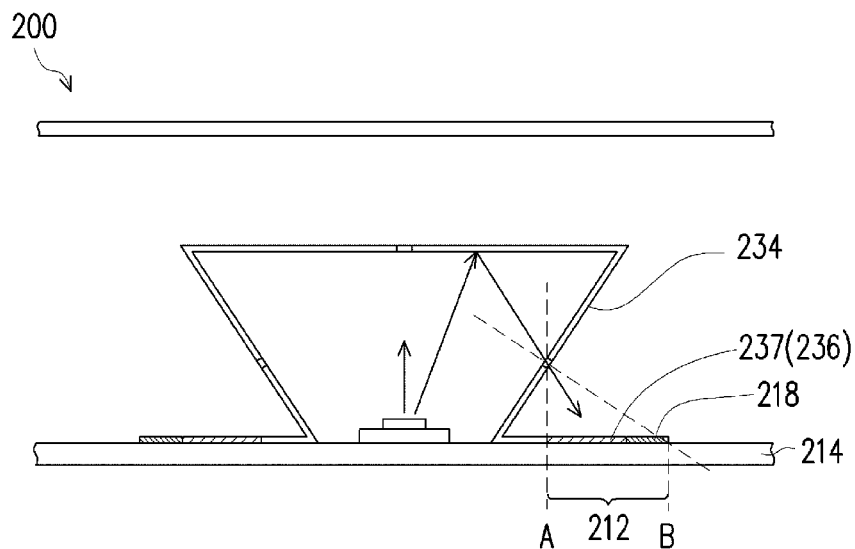
FIG. 3A is a partially cross-sectional schematic view of a backlight module according to another embodiment of the present disclosure.

FIG. 3A is a partially cross-sectional schematic view of a backlight module according to another embodiment of the present disclosure. Referring to FIG. 3A, a backlight module 200 of FIG. 3A differs from the backlight module 100 of FIG. 1B mainly in that, in FIG. 1B, the illumination adjusting structures 116 are holes, and the reflecting base 114 is configured to make some light irradiated onto the illumination adjusting section 112 directly pass through the illumination adjusting structures 116 without being reflected by reflecting base 114, through the illumination adjusting structures 116 located at the illumination adjusting section 112, while in FIG. 3A, a light-absorbing element is used as an illumination adjusting structure 218, to reduce the light reflection in a light-absorbing manner.

In FIG. 3A, the illumination adjusting structure 218 is disposed in an illumination adjusting section 212, and the illumination adjusting structure 218 comprises a light-absorbing layer, for example, a light-absorbing ink layer or a light-absorbing adhesive layer. The illumination adjusting structure 218 may be disposed on a reflecting base 214 and located within the illumination adjusting section 212. Similarly, if a part of a bottom portion 236 is located at the illumination adjusting section 212, this part of the bottom portion 236 may also have the illumination adjusting structure 218, for example, a light-absorbing layer 237. Some light passing through a sidewall 234 will be absorbed by the illumination adjusting structure 218 without being directed away from the reflecting base 214. Of course, the type of the illumination adjusting structure 218 is not limited thereto. In addition, although in the present embodiment, the illumination adjusting structure 218 is disposed at the regions of the reflecting base 214 and the bottom portion 236, in other embodiments, the illumination adjusting structure 218 may also only cover the bottom portion 236, namely, the overall illumination adjusting section 212 is disposed within the bottom portion 236.

In addition, in other embodiments, the illumination adjusting structure 218 may also comprise a rough surface, and some light passing through the sidewall 234 is diffused or scattered by the illumination adjusting structure 218 without being directed away from the reflecting base 214. That is, the scattering of the light in the illumination adjusting section 212 is greater than the scattering in other regions of the reflecting base 214. Alternatively, in other embodiments, a reflecting base assembly may also comprise the reflecting base 214 with the holes and the illumination adjusting structure 218 with the light-absorbing layer or the rough surface, such that some light irradiated onto the illumination adjusting section 212 directly passes through the holes, some light is absorbed, diffused or scattered, and only some light is reflected by the reflecting base 214 to be directed toward the optical film. Similarly, this part of the bottom portion 236 that is located at the illumination adjusting section 212 may also comprise a rough surface or pores to diffuse the light or allow the light to pass through.

Figure 3B:
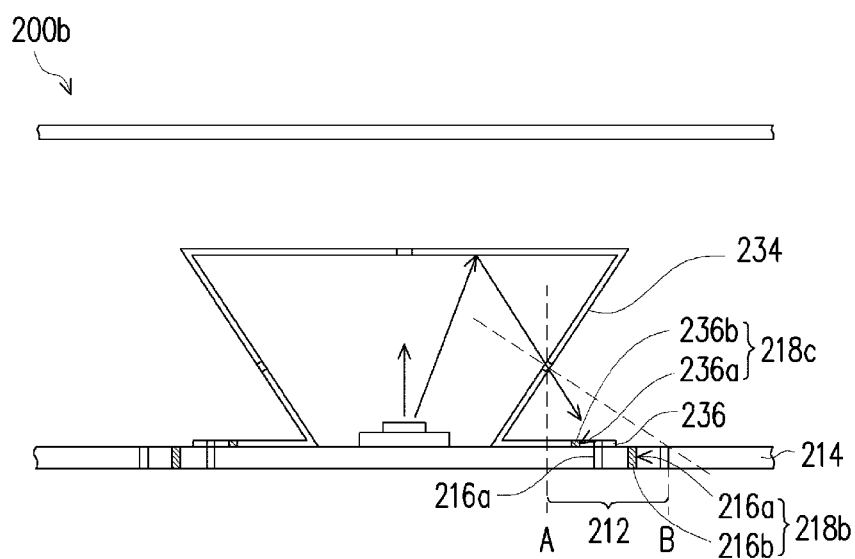
FIG. 3B is a partially cross-sectional schematic view of a backlight module according to another embodiment of the present disclosure.

FIG. 3B is a partially cross-sectional schematic view of a backlight module according to another embodiment of the present disclosure. In a backlight module 200b of FIG. 3B, components which are the same as or similar to those in the previous embodiment are indicated by the same or similar symbols. Referring to FIG. 3B, the backlight module 200b of FIG. 3B differs from the backlight module 200 of FIG. 3A mainly in that, in FIG. 3A, the illumination adjusting structure 218 is a light-absorbing layer, for example, a light-absorbing ink layer or a light-absorbing adhesive layer. In FIG. 3B, an illumination adjusting structure 218b comprises a hole 216a in the illumination adjusting section 212 at the reflecting base 214 and a light-absorbing layer 216b in at least one part of the hole 216a, and an illumination adjusting structure 218c comprises a hole 236a in the illumination adjusting section 212 at the bottom portion 236 and a light-absorbing layer 236b in at least one part of the hole 236a. The hole 216a also is provided below the hole 236a that is not filled with the light-absorbing layer 236b. Some light irradiated onto the illumination adjusting section 212 passes through the holes 216a, 236a, and some light is absorbed by the light-absorbing layers 216b, 236b in the holes 216a, 236a.

In addition, in other embodiments, a part of the holes 216a, 236a may also not extend through the reflecting base 214 or the bottom portion 236 with formation of rough surfaces on at bottoms of the holes 216a, 236a, such that some light passes through the hole 216a extending through the reflecting base 214, and some light is diffused by the rough surfaces on at the bottoms of the holes 216a, 236a that do not extend through the reflecting base 214 or the bottom portion 236. Alternatively, in other embodiments, a surface of the reflecting base 214 corresponding to the hole 236a of the bottom portion 236 may also be a rough surface, such that the light is diffused by the hole 236a extending through the bottom portion 236. That is, in the backlight modules 100, 100b, 200, 200b of the present disclosure, by providing the illumination adjusting structures 116 on the reflecting bases 114, 214 or the bottom portions 136, 236 of the 3D optical control structure 130 at the illumination adjusting sections 112, 112b or by providing the illumination adjusting structures 218, 218b capable of absorbing light or scattering light in the illumination adjusting section 212, some light emitted from the light source passes through the sidewalls 134, 234 to the illumination adjusting sections 112, 112b, 212 to be transmitted, absorbed or diffused, and only some light can be reflected by the reflecting bases 114, 214 or the bottom portions 136, 236 to be directed away from the reflecting bases 114, 214. Hence, the light amount reflected by the illumination adjusting sections 112, 112b, 212 is reduced to avoid the formation of bright regions, thereby improving the brightness uniformity of the light emitted from the backlight modules 100, 100b, 200.

Figure 4:
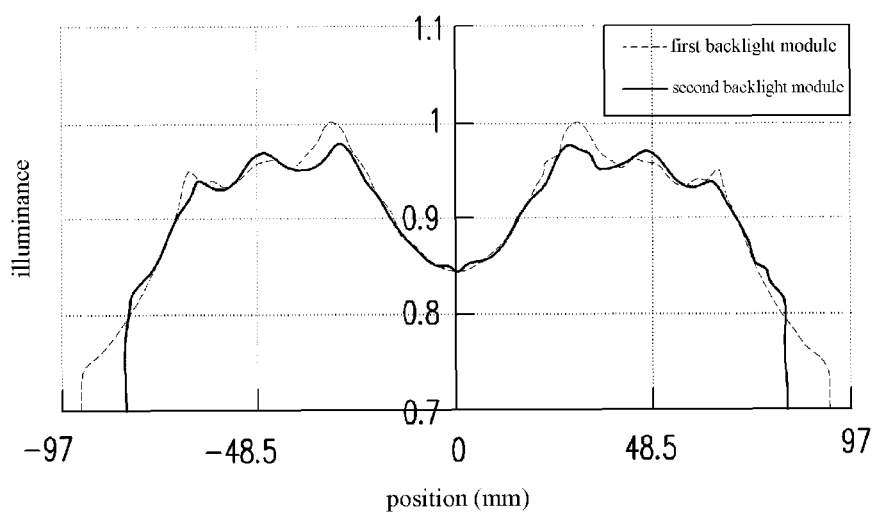
FIG. 4 is a diagram showing experimental results of various backlight modules having different forms of illumination adjusting sections.

FIG. 4 is a diagram showing experimental results of various backlight modules having different forms of illumination adjusting sections. Referring to FIG. 4, two backlight modules are used in the experiments herein. The first backlight module is one without holes disposed on the reflecting base or without an illumination adjusting structure. The second backlight module is one having the illumination adjusting structure that comprises a scattering pattern, for example, a scattering pattern formed of a plurality of through-holes. It can be known from the experimental results of the two backlight modules in FIG. 4 that, in a range of ±30 mm to 70 mm on the x axis, a significant illuminance peak appears at about ±30 mm on the x axis for the first backlight module, namely, bright lines will occur in this region. Compared to the first backlight module, the second backlight module having the illumination adjusting structure that comprises the scattering pattern enables the brightness/darkness degree at various positions in ±30 mm to 70 mm on the x axis to be more close to each other, thus emitting light of more uniform brightness.

In sum, in the backlight module of the present disclosure, the 3D optical control structure itself can freely stand on the reflecting base and cover the light source without the need of an additional spacer for providing the support, thus effectively reducing the cost and the assembling processes. Compared to the flat optical control plate, the 3D optical control structure also provides the through-holes of the sidewalls for adjusting the light distribution at both sides close to the light source. In addition, in the 3D optical control structure, a position of an orthogonal projection of one of the through-holes closest to the reflecting base to the reflecting base is A, and a position where a normal line of the sidewall passing through one of the through-holes furthest from the reflecting base intersects the reflecting base is B. Some light emitted from the light source that is reflected by the top portion to directly pass through the through-holes of the sidewalls to be directed at the reflecting base will fall within the illumination adjusting section between A and B. Such light is once-reflected with a strong light energy, and will lead to bright regions of the backlight module when being further reflected by the reflecting base to be out of the backlight module. In the backlight module of the present disclosure, by providing a particular design in the illumination adjusting section between A and B, a part of the light reflected by the top portion to pass through the sidewalls to be directed at the illumination adjusting section will be transmitted through the reflecting base, or absorbed, diffused or scattered by the illumination adjusting structure without being directed away from the reflecting base. That is, only a part of the light directed at the illumination adjusting section will be reflected by the reflecting base to be directed away from the reflecting base. Thus, the brightness of the light reflected by the reflecting base in the illumination adjusting section is reduced, avoiding non-uniform brightness of the light emitted from the backlight module.

Even though the present invention has been disclosed as the abovementioned embodiments, it is not limited thereto. Any person of ordinary skill in the art may make some changes and adjustments without departing from the spirit and scope of the present invention. Therefore, the scope of the present invention is defined in view of the appended claims.

What is claimed is:

1. A backlight module, comprising:
   a reflecting base;
   a light source, disposed on the reflecting base;
   at least one 3D optical control structure, disposed on the reflecting base and covering the light source, comprising a top portion and two sidewalls connected to the top portion, wherein the two sidewalls face the reflecting base obliquely and opposite to each other, and at least one of the sidewalls comprises a first through-hole; and
   at least one illumination adjusting structure, adjacent to the sidewall having the first through-hole, wherein an orthogonal projection of the first through-hole to the reflecting base is projecting at a first position, and a normal line of the sidewall passing through the first through-hole intersects the reflecting base is projecting at a second position;
   wherein an illumination adjusting section is between the first position and the second position, and the at least one illumination adjusting structure is disposed in the illumination adjusting section; wherein the illumination adjusting structure comprises a plurality of holes, a light-absorbing ink layer, a light-absorbing adhesive layer, a rough surface, or a combination thereof.

2. The backlight module of claim 1, wherein the sidewall having the first through-hole further comprises a second through-hole and a third through-hole, wherein an orthogonal projection of the second through-hole to the reflecting base is projecting at a third position, and a normal line of the sidewall passing through the third through-hole intersects the reflecting base is projecting at a fourth position, wherein the illumination adjusting section is between the third position and the fourth position, wherein the second through-hole is closest to the reflecting base, and the third through-hole is furthest from the reflecting base.

3. The backlight module of claim 1, wherein the illumination adjusting structure is disposed at the reflecting base, and the illumination adjusting structure comprises a plurality of holes in the illumination adjusting section at the reflecting base.

4. The backlight module of claim 3, wherein the holes of the illumination adjusting section have various sizes and various spacings exist between the holes.

5. The backlight module of claim 1, wherein the illumination adjusting structure is disposed at the reflecting base, wherein the illumination adjusting structure comprises a light-absorbing ink layer, a light-absorbing adhesive layer, or a rough surface.

6. The backlight module of claim 1, wherein the 3D optical control structure further comprises a bottom portion connected to the sidewall having the first through-hole, the bottom portion is disposed on the reflecting base, and the illumination adjusting structure is disposed on the bottom portion.

7. The backlight module of claim 6, wherein the illumination adjusting structure disposed on the bottom portion is a plurality of through-holes, and the through-holes have light-absorbing layers therein.

8. The backlight module of claim 1, wherein the 3D optical control structure further comprises a bottom portion connected to the sidewall having the first through-hole, and the bottom portion is disposed on the reflecting base, wherein the illumination adjusting section is partially located at the bottom portion and partially located at the reflecting base.

9. The backlight module of claim 8, wherein the illumination adjusting structure is a plurality of holes, a light-absorbing ink layer, or a light-absorbing adhesive layer.

10. The backlight module of claim 1, wherein the top portion and the sidewalls of the 3D optical control structure are a planar surface, a cambered surface, or a curved surface.

11. The backlight module of claim 1, further comprising:
   an optical film, located above the reflecting base, the light source, and the 3D optical control structure.

12. A 3D optical control assembly, comprising:
   a top portion;
   two sidewalls, connected to the top portion respectively, wherein the two sidewalls extend downwards from the top portion obliquely and are opposite to each other, and at least one of the sidewalls comprises a first through-hole;

at least one bottom portion, connected to the sidewall having the first through-hole; and at least one illumination adjusting structure, located at the bottom portion, wherein an orthogonal projection of the first through-hole to the bottom portion is at a first position, wherein an illumination adjusting section is between the first position and an edge of the bottom portion, and the at least one illumination adjusting structure is disposed in the illumination adjusting section; wherein the illumination adjusting structure comprises a plurality of holes, a light-absorbing ink layer, a light-absorbing adhesive layer, a rough surface, or a combination thereof.

13. The 3D optical control assembly of claim 12, wherein the sidewall having the first through-hole further comprises a second through-hole and a third through-hole, wherein an orthogonal projection of the second through-hole is projecting at a second position, wherein the illumination adjusting section is between the second position and the edge of the bottom portion, and the second through-hole is closest to the bottom portion.

14. The 3D optical control assembly of claim 12, wherein the illumination adjusting structure is a plurality of holes, the holes have various sizes, and various spacings exist between the holes.

15. The 3D optical control assembly of claim 12, wherein the illumination adjusting structure is a plurality of holes, and the holes have light-absorbing layers therein.

16. The 3D optical control assembly of claim 12, wherein the top portion is parallel to the bottom portion, and a sharp angle is formed between the sidewall and the bottom portion.

* * * * *